No. 818,731. PATENTED APR. 24, 1906.
B. ADRIANCE & A. CALLESON.
SHEET METAL CAN.
APPLICATION FILED APR. 1, 1902.
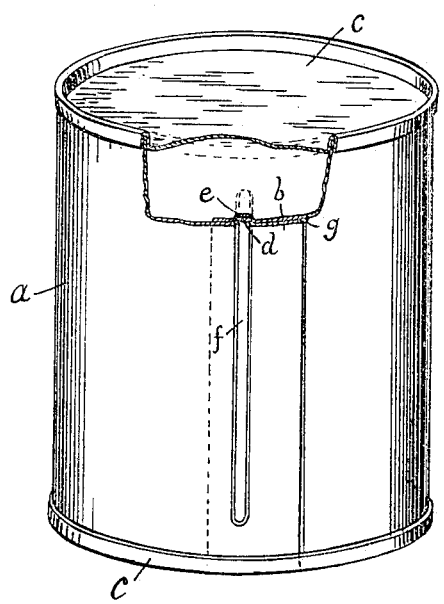
Witnesses:
Richard J. Harvey
Edward J. Murphy
Inventors,
Benjamin Adriance,
Amos Calleson,
By Samuel W. Balch
Attorney

UNITED STATES PATENT OFFICE.

BENJAMIN ADRIANCE AND AMOS CALLESON, OF BROOKLYN, NEW YORK; SAID CALLESON ASSIGNOR TO SAID ADRIANCE.

SHEET-METAL CAN.

No. 818,731.  Specification of Letters Patent.  Patented April 24, 1906.

Application filed April 1, 1902. Serial No. 101,004.

*To all whom it may concern:*

Be it known that we, BENJAMIN ADRIANCE and AMOS CALLESON, citizens of the United States of America, and residents of the borough of Brooklyn, in the county of Kings, city of New York, and State of New York, have invented certain new and useful Improvements in Sheet-Metal Cans, of which the following is a specification.

Our invention relates to the longitudinal body-seam of a sheet-metal can in which this seam is formed by lapping the ends of the sheet metal forming the can-body, and is a lap-seam as distinguished from a lock-seam, in which the edges of the sheet metal forming the body are bent over or hooked and the hooked edges interlocked.

In the manufacture of sheet-metal cans by machinery the can-body is formed around a horn and then slipped along the horn in the direction of the axis of the can-body to places where the body-seam is fluxed and soldered, after which the can-body is slipped farther along the horn while the soldered joint is cooling and setting, and the can-body is prepared for the heads, which are attached to the end or ends of the body, thus completing the can. When a can-body with a lap-seam is thus manufactured, difficulty is experienced in keeping the exact amount of lap in the seam which it had when the body was formed during the transfer of the body to the place where it is soldered and while it is being soldered and is being removed from the soldering devices and the soldered joint is setting. Any such change in the amount of the lap would change the size of the can-body and there would be difficulty in fitting the heads. In the case of cylindrical can-bodies a further difficulty is experienced in keeping the body from rotating more or less while it is being transferred to the place where it is to be soldered, and thereby not coming at the proper point for soldering. Such a machine, wherein can-bodies are formed with lap-seams at one point on a horn and slipped to another point on the horn to be soldered and after being soldered slipped still farther along the horn while the soldered joint is cooling and setting, is shown in an application for United States patent for improvements in can-making machines, executed by us March 18, 1902, and filed concurrently with this application.

Our invention, the purpose of which is mainly to obviate these difficulties in manufacture, but is also to strengthen the lap-joint side seam, consists in providing can-bodies with matching beads and grooves in the lapped edges of the can-bodies.

In further explanation of our invention reference will be made to the accompanying sheet of drawings, in which the figure shows a can in perspective, which is broken away at one corner across the body-seam.

The can illustrated has a cylindrical body $a$, formed from a rectangular piece of sheet metal with the edges lapped at $b$. The ends $c$ $c$ complete the can. In the outer lapped edge is a bead, and in the inner lapped edge is a groove, the two matching together at the joint $d$. The surface of the bead in the outer lapped edge which contacts with the groove in the inner lapped edge at the joint is a continuation of the inside surface of the can. The surface of the groove in the inner lapped edge with which the bead in the outer lapped edge contacts is a continuation of the outside surface of the can-body. The bead and the groove are both formed without breaking through and perforating the sheet metal, and the groove has flaring sides, as has the matching bead and the groove on the opposite side of the sheet metal, so that the forming-tools can be of the simplest character and are readily withdrawn. On the opposite side from the groove in the inner lapped edge and projecting inwardly into the can is a bead $e$, which is not essential to the function of the matching beads and grooves, but results from the formation of the groove on the opposite side of the thin sheet metal. Likewise the groove $f$ in the outer lapped edge is made in the formation of the bead on the opposite side, which matches with the groove in inner lapped edge. Solder $g$ at the edge of the outer lapped edge permanently holds the lapped edges together.

It is not essential to the invention that the matching beads and grooves should have any particular length as compared with their width or the length of the can-body; but if elongated the elongation should be in the direction of the axes of the can-bodies, and it is desirable that they should be slightly shorter than the lengths of the can-bodies, so as not to be in the way of the joints with the ends of the cans. Likewise it is immaterial which of the lapped edges is provided with the bead and which with the groove; but it is preferable that the groove should be in the inner lapped edge and the inwardly-projecting bead in the outer lapped edge, since there will then be no projection on the outside surface of the can which might be objectionable in handling and interfere with the application of labels.

What we claim as new, and desire to secure by Letters Patent of the United States, is—

1. In a sheet-metal can-body with lapped edges forming a longitudinal lap-joint body-seam, an imperforate bead resulting from a groove formed in one of the lapped edges, an imperforate groove with flaring sides in the other lapped edge matching with the bead, the contacting surfaces of the bead and groove being one a continuation of the inside surface and the other a continuation of the outside surface of the can-body, said bead and groove being shorter than the length of the can-body so as to provide smooth lapped seams where the ends are secured to the can-body, and a soldered joint adjoining the matching bead and groove and between the facing surfaces of the can-body at the lapped edges.

2. In a sheet-metal can-body with lapped edges forming a longitudinal lap-joint body-seam, an imperforate bead resulting from a groove formed in the outer lapped edge, an imperforate groove with flaring sides formed in the inner lapped edge matching with the bead, the surface of the bead which contacts with the groove being a continuation of the inside surface of the can-body, said bead and groove being shorter than the length of the can-body so as to provide smooth lapped seams where the ends are secured to the can-body, and a soldered joint adjoining the matching bead and groove and between the facing surfaces of the can-body at the lapped edges.

Signed in the borough of Brooklyn, city of New York, N. Y., this 19th day of March, 1902.

BENJAMIN ADRIANCE.
AMOS CALLESON.

Witnesses:
SAMUEL W. BALCH,
WILLIAM C. HORN.